March 27, 1951 W. C. JOHNSON ET AL 2,546,307

LIMITER CIRCUIT FOR TELEMETERING SYSTEMS

Filed Oct. 1, 1947 3 Sheets-Sheet 1

Inventors:
Walter C. Johnson
William O. Stevenson, Jr.
By Stowell & Evans
Attorneys.

March 27, 1951 W. C. JOHNSON ET AL 2,546,307

LIMITER CIRCUIT FOR TELEMETERING SYSTEMS

Filed Oct. 1, 1947 3 Sheets-Sheet 2

Inventors:
Walter C. Johnson
William O. Stevenson, Jr.

By Stowell + Evans

Attorneys.

March 27, 1951 W. C. JOHNSON ET AL 2,546,307

LIMITER CIRCUIT FOR TELEMETERING SYSTEMS

Filed Oct. 1, 1947 3 Sheets-Sheet 3

Inventors:
Walter C. Johnson
William D. Stevenson, Jr.

By Stowell & Evans
Attorneys.

Patented Mar. 27, 1951

2,546,307

UNITED STATES PATENT OFFICE 2,546,307

LIMITER CIRCUIT FOR TELEMETERING SYSTEMS

Walter C. Johnson, Princeton, N. J., and William D. Stevenson, Jr., Raleigh, N. C., assignors to the United States of America as represented by the Secretary of the Navy Application October 1, 1947, Serial No. 777,324

1 Claim. (Cl. 178—44)

This invention relates to limiter circuit for telemetric systems whereby metering devices for pressure, acceleration, strain and other quantities are registered at a distance by means of electronic transmitting and receiving apparatus.

In telemetric systems, the indications of a plurality of metering devices may be recorded continuously or intermittently. For recording a plurality of metering devices, the invention employs a radio transmitter carrier frequency modulated by a plurality of sub-carrier oscillators each of which is frequency deviated by coupling with its respective metering device and a suitable radio receiving system including filters for separating sub-carrier oscillator generated frequencies.

An object of the invention is to provide an improved receiving system for multi-channel frequency modulated signals.

A further object of the invention is to provide an improved signal amplitude limiter for a frequency modulated radio receiving system.

These and other objects and advantages will be more clearly evident from the following detailed description of an illustrative embodiment of the invention with particular reference to the accompanying drawings in which.

Figure 1:
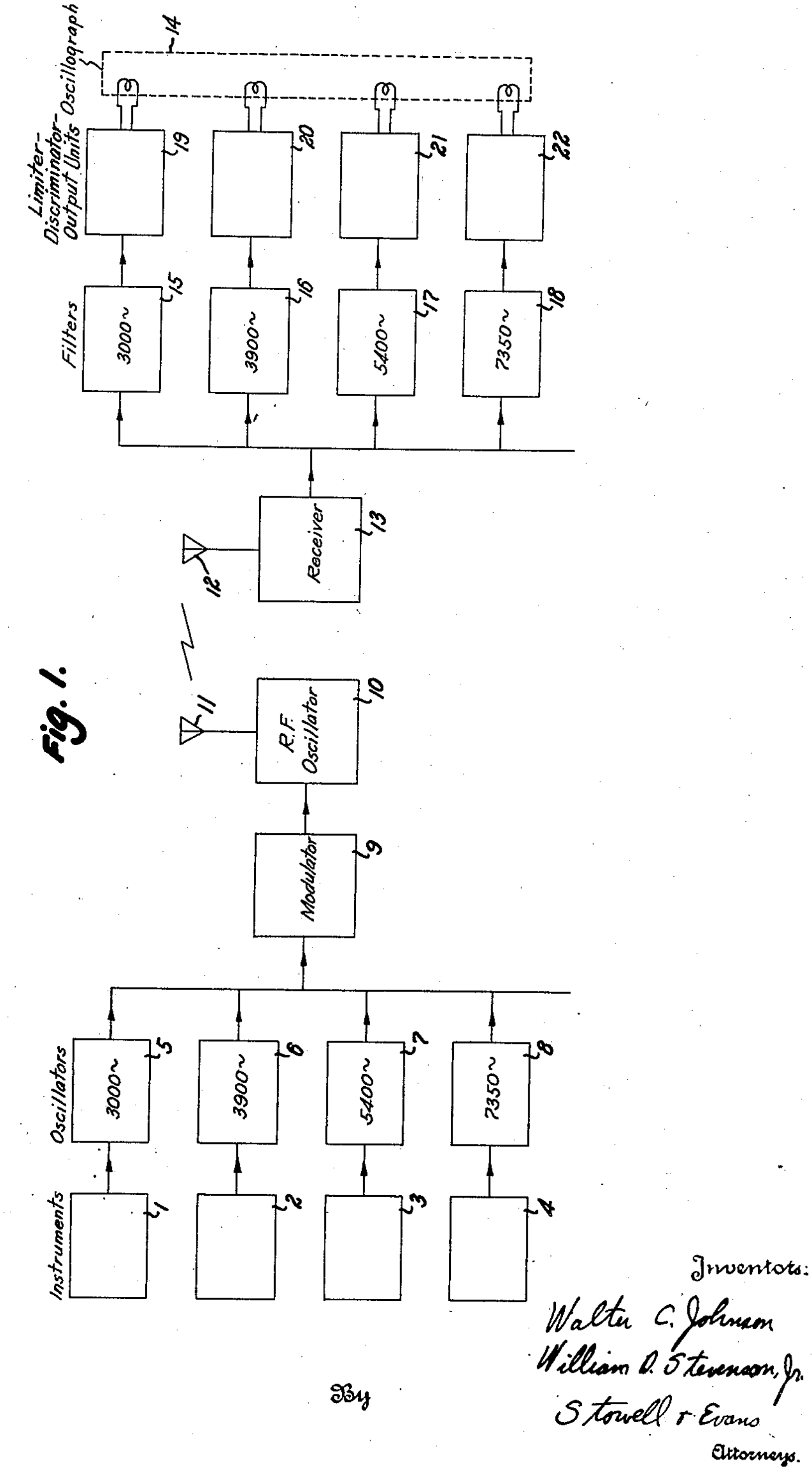
Fig. 1 is a diagrammatic representation of a telemetric system including radio transmitting and receiving apparatus embodying the principles of the invention.

In the drawings, Fig. 1 illustrates a four channel radio transmitting and receiving telemetric system in which 1, 2, 3 and 4 indicate instruments or meter devices adapted to control the frequency of their respective sub-carrier oscillators 5, 6, 7 and 8 whose outputs are coupled with a frequency modulator 9 for a radio frequency transmitting oscillator 10 operating into antenna 11. A radio receiving antenna 12 feeds into a radio receiver 13 whose output is frequency separated by filters 15, 16, 17 and 18 coupled respectively with limiter-discriminator-output units 19, 20, 21 and 22 which are designed to operate a suitable recording oscillograph 14. Instruments 1, 2, 3 and 4 may be of any number and type desired, but more commonly will be suitable for measurement of pressure, acceleration or strains occurring in a flying airplane, small missiles and the like capable of carrying miniature radio apparatus. Some instruments may have a direct mechanical output as represented by the movement of a pressure diaphragm or the acceleration movement of a weight relative its housing, while other instruments, as typified by familiar strain gauges employing a fine resistance wire, may have an electric circuit output such as a variation in electrical resistance. Sub-carrier oscillators 5, 6, 7 and 8 may be of any known types or their equivalents such as single tube, tuned-circuit, feedback oscillators like the well-known Hartley type, multivibrator type oscillators, or multi-stage oscillators having a phase shifting feedback network. For simplicity, oscillator types to be described hereinafter will be restricted without limitation to an oscillator designed for frequency change by direct mechanical movement of a magnetic or electric circuit element for coupling with an instrument having a direct mechanical output. It will be understood that other transmitter units represented in the telemetric system of Fig. 1 are not limited to particular and specific designs to be described herein, and equivalent units known in the art may be substituted one for another without limitation.

Sub-carrier oscillators 5, 6, 7 and 8 of Fig. 1 will have differing center frequencies which will be deviated, or varied up or down, by action of their respective coupled instruments 1, 2, 3 and 4. By way of illustration, sub-carrier oscillators 5, 6, 7 and 8 may have respective center frequencies of 3000, 3900, 5400 and 7350 cycles per second and corresponding receiver filters 15, 16, 17 and 18 are designed to separate said respective center frequencies, including the frequency band represented by the deviation action of each of respective coupled instruments 1, 2, 3 and 4, into channels for the separate limiter-discriminator-output units, respectively 19, 20, 21 and 22. Frequency deviation and modulation—where modulation conveys the idea of relatively rapid frequency changes and deviation of relatively slow frequency changes—are well understood in the art and are the same in principles of apparatus design. In general, instrument movements are slow compared with sound vibrations and radio transmission sub-carrier oscillator frequencies can be lower in frequency than those commonly employed in sound frequency modulation. With the understanding that apparatus design is directed toward the employment of relatively low sub-carrier frequencies, modulation methods and band pass filter circuits of any type familiar in frequency modulated radio transmitting and receiving systems may be employed. Sub-carrier oscillator frequencies are preferably selected to avoid interference one with another, directly or by harmonics, and for ease of designing suitable separation filter circuits in view of the number of channels desired. Recording oscillograph 14, or an equivalent final recorder, records frequency deviations of sub-carrier oscillators 5, 6, 7 and 8, where frequency deviations are synonymous with frequency modulations of a low rate of change. Although four sub-carrier oscillators and receiving channels are indicated in Fig. 1, the actual number employed is immaterial and unlimited except by practical apparatus design considerations.

Although the transmission of the modulated signal from the transmitter to the receiver is diagrammatically indicated in the figures as being between transmitting and receiving antennas, the signal may also be transmitted over suitable conductive transmission lines especially when both the transmitter and the receiver are in fixed locations.

Figure 2:
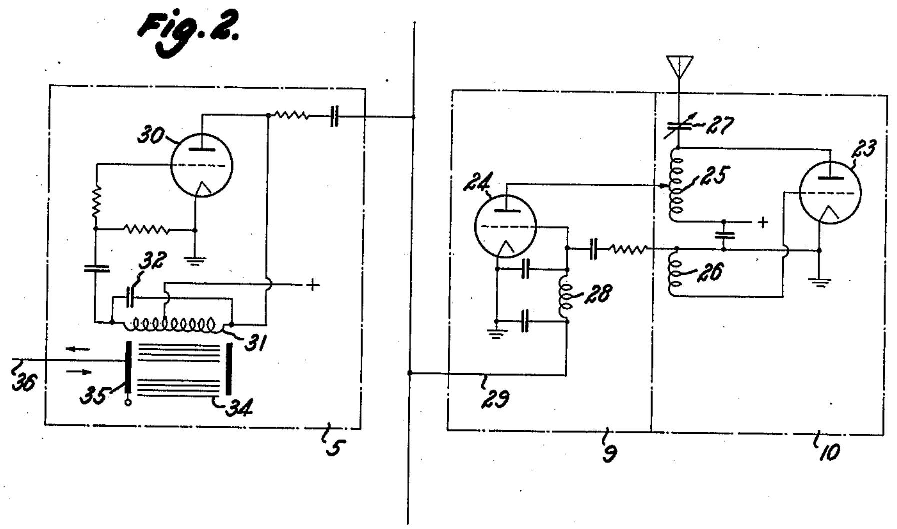
Fig. 2 is a schematic diagram of a frequency modulated radio transmitter including a plurality of instrument controlled sub-carrier oscillators.

In Fig. 2, blocks 9 and 10 together include a radio frequency transmitting oscillator tube 23 and a frequency modulator tube 24 with associated circuit apparatus in schematic form. Transmitting oscillator section, block 10, may comprise any familiar oscillator circuit as here represented by tube 23 having a plate coil 25, tuned by circuit capacitances and the capacitance of an antenna 11 with adjustment of oscillator frequency controlled by antenna series capacitor 27, and a grid coil 26 inductively coupled with plate coil 25. Modulator section, block 9, similarly may comprise any familiar frequency modulation apparatus as here represented by tube 24 having a grid connection through a radio frequency choke coil 28 with a line 29 carrying modulation frequencies and a plate connection with a tap on coil 25, block 10, whereby the reactance of coil 25 is varied within desired limits and the transmitting oscillator is thereby frequency modulated.

In block 9—10 and elsewhere in the drawings, conventional circuit elements such as by-pass and coupling capacitors with feed or circuit closing resistors of obvious purpose and type need no reference description which is omitted for brevity. Likewise, to avoid confusion in the drawings, tube filament and power circuits are not completed and a source of tube plate current supply, batteries or equivalent, is indicated by a simple plus mark with understanding that ground symbols and negative current supply are interconnected.

One type of sub-carrier oscillator adapted for frequency deviation or modulation by an instrument having a mechanical movement output is illustrated in block 5 of Fig. 2. Here, an oscillator tube 30 is connected in a typical Hartley oscillator circuit having a tapped coil 31 tuned by a capacitor 32 and a coil core 34 of magnetic material with a movable portion or armature 35 having a connection 36 with a driving instrument. Movement of armature 35 varies the magnetic circuit of core 34 with a change of the inductance of coil 31 and the frequency of the sub-carrier oscillator. The oscillator of block 5 has many possible variations or equivalents and is here shown as representative of a type of unit useful in the telemetric system of this invention.

Essentials of the transmitting portion of the telemetric system of this invention have been described. The receiving portion of the telemetric system includes the improved limiter to be described, but otherwise follows conventional practices in frequency modulation radio receiver design with the exception that relatively low or audio frequency modulation sub-carriers are advantageously employed in place of radio frequency carriers as are used in sound transmission. Antenna 12 coupled receiver 13, Fig. 1, may be a conventional superheterodyne type designed to convert and amplify the incoming radio frequency signal carrying the frequency modulation of sub-carrier oscillators 5—8 and the frequency deviations controlled by their respective meter devices or instruments 1—4. Receiver 13 has a conventional discriminator output, or equivalent, designed to feed sub-carrier oscillator frequencies to separation filters 15—18 which may be of any common type designed for the relatively low frequencies employed. Each of filters 15—18 passes only the sub-carrier frequency range of its corresponding oscillator 5, 6, 7, or 8 to its corresponding amplifier-limiter-discriminator unit 19, 20, 21 or 22 which drives a corresponding element of recording oscillograph 14 or an equivalent recorder.

In a telemetric system of the character described employing frequency modulation, exceptionally good elimination of amplitude modulations in the receiving system is desirable. Since action of meter devices or instruments 1–4 of Fig. 1 is converted to frequency deviation or modulation controlling recording oscillograph 14 or an equivalent recorder, it is important to eliminate possible spurious responses as may be caused by amplitude variations in received signals. As is well understood, limiter or amplitude leveling amplifiers are commonly employed in frequency modulation radio receivers, but familiar limiters may not provide the distortionless frequency output desirable in a metering system.

Figure 3:
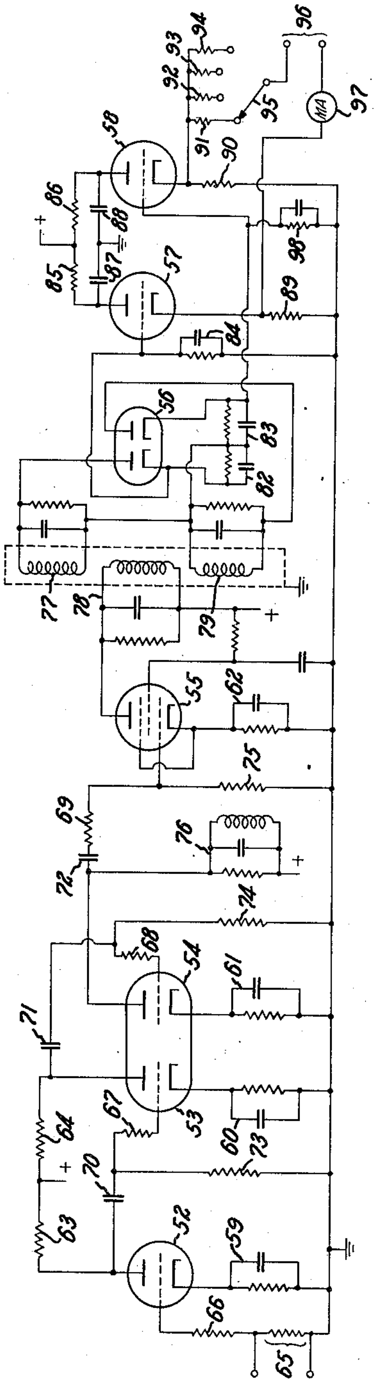
Fig. 3 is a schematic diagram of a radio receiver suitable for use in the telemetric system of the invention.

The improved limiter of the invention, including input and output apparatus, is represented schematically in Fig. 3. Here, a triode 52 serves as an input voltage amplifier and is followed by a double triode 53—54 operating as a dual voltage amplitude limiter. Tube 53—54 is coupled with a pentode 55 serving as another limiter stage and working into a double diode 56 in a frequency discriminator circuit. Tube 56 drives a pair of output cathode follower triodes 57 and 58. Tube types and circuit components are suggested by way of illustration with the understanding that suggested types and components are no limitation of this invention. Tube 52 may be a type 6J5, tube 53—54 a 6SN7, tube 55 a 6SJ7, tube 56 a 6H6, and tubes 57 and 58 may be parallel connected 6SN7 tubes or equivalent single triodes.

In the circuits of Fig. 3, 59, 60, 61 and 62 are typical cathode bias circuits having resistance values of 1500, 5000, 2500 and 400 ohms, respectively, and by-pass capacitors of about 10 mf. Tube plate feed resistors 63 and 64 may be respectively 15,000 and 100,000 ohms. An input circuit 65 of perhaps 5000 ohms impedance connects to one of filters 15—18 of Fig. 1 and works into tube 52. Series grid resistors 66, 67, 68 and 69 may have values from 0.1 to 1 megohm and serve the purpose of minimizing tube grid current flow on large positive voltage input peaks and also of maintaining satisfactorily high input circuit impedances.

Capacitors 70, 71 and 72 may be of 0.1 mf. capacitance and grid return resistors 73, 74 and 75 may be of 0.5 megohm resistance.

The plate of tube section 54 works into a tuned impedance 76 which comprises a parallel coil and capacitor circuit tuned to the desired operating frequency and having a parallel damping resistor of suitable value for restricting center frequency impedance to about 1.5 times the impedance at the deviation frequency limits, where it is understood that the limiter amplifier should provide reasonably uniform frequency response over a band of frequencies including deviation or modulation limits of the center frequency or nominal operating frequency.

The plate of limiter tube 55 works into a primary circuit 78 of a discriminator transformer 77—78—79 wherein 77 and 79 are secondary circuits working into double diode discriminator 56. Circuits 77, 78 and 79 comprise respective parallel coil and capacitor resistance damped tuned circuits, wherein primary circuit 78 is tuned to center operating frequency and secondary circuits 77 and 79 are tuned off center frequency, one above and one below. Discriminator transformers such as 77—78—79 are commonly adjusted by practical methods, and the coils of transformer 77—78—79 may have magnetic couplings equivalent to nine-tenths of critical coupling with other discriminator characteristics adjusted by selection of values of the damping resistors employed.

The cathodes of double diode discriminator 56 are connected by resistor-capacitor, 0.5 megohm and 0.01 mf. respectively, circuits 82 and 83 to discriminator secondary circuits 77 and 79. One cathode of tube 56 connects to the grid of output tube 57 and the other cathode of tube 56 connects to the grid of output tube 58. Grid return circuits 84 and 98 comprise resistors of 1 megohm and parallel 50 mmf. capacitors. Plate feed resistors 85 and 86 for tubes 57 and 58 are 1000 ohms with 50 mmf. capacitors 87 and 88 from tube plates to ground. Output tubes 57 and 58 are operated as cathode follower amplifiers having cathode to ground resistors 89 and 90 of 750 ohms each and a cathode to cathode output circuit which may include several resistors 91, 92, 93 and 94 of different values with a selector switch 95 and a meter 97 with output terminals at 96 for connection to an oscillograph element or other indicating device. The output circuit shown is illustrative only and may readily be changed for suitable matching with different types of indicating devices.

Since the circuit of Fig. 3 is designed for improved amplitude limiting of a received sub-carrier signal, it is convenient to designate tubes 52 and 53—54 and associated circuits preceding tuned circuit 76 as a first limiter amplifier; with tube 55 and its associated circuits following tuned circuit 76 being a second limiter amplifier. Thus the circuit includes two limiter amplifiers with a tuned circuit 76, or tuned circuit impedance, interposed between the two limiter amplifiers.

Figure 4:
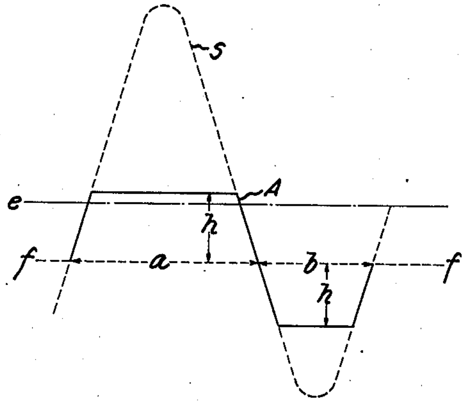
Fig. 4 is an explanatory diagram illustrating limiter distortion corrected by the limiter of the invention.

The advantages of this dual limiter amplifier with interposed tuned circuit may be more clearly shown with reference to wave shape distortion indicated in the graphic drawing of Fig. 4. A limiter amplifier is intended to remove amplitude modulation from frequency modulated signals which is done by restricting top and bottom halves of an incoming wave, as sine wave S of Fig. 4, to predetermined values or heights $h$. Sine wave S of Fig. 4 is centered on line $e—e$; but, because of stray capacitances and dissymmetries in the circuit, the output of an amplitude limiter represented by flat-topped wave A appears as if centered on line $f—f$ and the top and bottom portions of wave A are unsymmetrical as is represented by differing base lengths $a$ and $b$ on line $f—f$. Lack of symmetry of wave A becomes greater as the amplitude of incoming wave S is increased. As the shape of wave A changes, the amplitude of its fundamental component varies, even when the peak-to-peak amplitude of the wave remains constant.

The tuned circuits of a discriminator respond principally to the fundamental component of an applied wave. Then, if wave A were applied directly to a discriminator, the output would vary somewhat with the amplitude of the incoming signal S and would not have the accuracy required in a metric system.

The addition of further amplitude-limiting stages cannot correct the output of the first limiter, for such stages can serve only to maintain the height $h$ of the wave more nearly constant, and cannot bring the widths $a$ and $b$ back to equality. In fact, because of dissymmetries in the additional amplitude-limiting stages, the widths $a$ and $b$ of the output may be made still more unequal as the amplitude of the incoming signal is increased. Thus, amplitude-limiting stages remove the original variation, namely the variable height of the wave, but they introduce a second variation, namely the variation in widths $a$ and $b$, which must also be removed if the input to the discriminator is to have a fundamental component which is truly independent of the amplitude of the incoming signal.

If the output of one or more amplitude-limiting stages is passed to an appropriate circuit tuned to the fundamental component of the wave, such as tuned circuit 76 of Fig. 1, the voltage across the tuned circuit will be substantially sinusoidal and will, therefore, be symmetrical and will have equal widths on the positive and negative loops, thus effectively removing the second variation which was introduced in the previous amplitude-limiting stages. At this point the wave is similar to that at the input, but with the amplitude variation considerably less. If the voltage across the tuned circuit is applied to another stage of amplitude limitation, such as tube 55 and its associated circuits in Fig. 3, the latter will operate under relatively constant conditions and its output will have a fundamental component which is very nearly independent of the amplitude of the input signal. If desired, as many stages connected in the sequence (amplitude limitation-tuned circuit-amplitude limitation) can be used as are necessary to produce the required independence of input signal amplitude. The output of the composite limiter can be applied to a discriminator, which will then afford the true response to frequency and independence of signal amplitude desired in a telemetric system of the character described.

It will be understood that the new and useful features of this invention include the practical application of frequency modulation methods in a telemetric system together with elements and apparatus of operative types useful or preferred for the purposes set forth but not limiting the scope of this invention to the particular apparatus designs shown and described. Of especial importance is the relative simplicity of the frequency modulation methods and apparatus described herein and the consequent adaptability to miniature and lightweight constructions necessary in many practical applications of a telemetric system.

What is claimed is:

In a receiver for a multi-channel frequency modulation telemetering system, a multi-stage limiter having a first stage including a twin triode, a series resistance-capacitance circuit connecting the sections of the twin triode, a second limiter stage including a pentode, and means coupling said limiter stages and including a tuned impedance comprising a parallel inductance and capacitance tuned to a desired operating frequency and a damping resistance in parallel with said resistance and capacitance for restricting center frequency impedance, whereby said limiter will provide reasonably uniform frequency response and amplitude component rejection over a predetermined band of frequencies.

WALTER C. JOHNSON.
WILLIAM D. STEVENSON, Jr.

REFERENCES CITED

The following references are of record in the file of this patent:

UNITED STATES PATENTS

| Number | Name | Date |
|---|---|---|
| 2,104,012 | Armstrong | Jan. 4, 1938 |
| 2,105,558 | Smith | Jan. 18, 1938 |
| 2,262,406 | Rath | Nov. 11, 1941 |
| 2,289,840 | Herz | July 14, 1942 |
| 2,298,409 | Peterson | Oct. 13, 1942 |